(12) United States Patent
Ishii et al.

(10) Patent No.: US 11,448,077 B2
(45) Date of Patent: Sep. 20, 2022

(54) METHOD FOR MANUFACTURING TURBO FAN

(71) Applicant: DENSO CORPORATION, Kariya (JP)

(72) Inventors: Fumiya Ishii, Kariya (JP); Shuzo Oda, Kariya (JP)

(73) Assignee: DENSO CORPORATION, Kariya (JP)

( * ) Notice: Subject to any disclaimer, the term of this patent is extended or adjusted under 35 U.S.C. 154(b) by 321 days.

(21) Appl. No.: 16/565,623

(22) Filed: Sep. 10, 2019

(65) Prior Publication Data

US 2020/0003062 A1 Jan. 2, 2020

Related U.S. Application Data

(63) Continuation of application No. PCT/JP2018/006457, filed on Feb. 22, 2018.

(30) Foreign Application Priority Data

Mar. 29, 2017 (JP) .............................. JP2017-065499

(51) Int. Cl.
| | |
|---|---|
| *F01D 5/30* | (2006.01) |
| *F04D 29/28* | (2006.01) |
| *B23K 11/12* | (2006.01) |

(52) U.S. Cl.
CPC ......... *F01D 5/3061* (2013.01); *F01D 5/3015* (2013.01); *F04D 29/281* (2013.01); *B23K 11/12* (2013.01)

(58) Field of Classification Search
CPC .... F04D 29/281; F01D 5/3061; F01D 5/3015; B23K 33/00; B29C 66/3022
See application file for complete search history.

(56) References Cited

U.S. PATENT DOCUMENTS

| | | | |
|---|---|---|---|
| 2014/0010682 A1* | 1/2014 | Suzuki | F04D 29/403 417/354 |
| 2018/0355882 A1 | 12/2018 | Ishii et al. | |
| 2019/0093665 A1* | 3/2019 | Ishii | F04D 29/28 |

FOREIGN PATENT DOCUMENTS

| | | | |
|---|---|---|---|
| JP | S5045309 | * | 4/1975 |
| JP | S5045309 A | | 4/1975 |
| JP | S5354301 A | | 5/1978 |
| JP | H6285994 A | | 10/1994 |
| JP | 3718996 B2 | | 11/2005 |
| JP | 4317676 B2 | | 8/2009 |
| JP | 5665802 B2 | | 2/2015 |
| WO | WO-2017/090348 A1 | | 6/2017 |

* cited by examiner

*Primary Examiner* — Sabbir Hasan

(74) *Attorney, Agent, or Firm* — Harness, Dickey & Pierce, P.L.C.

(57) ABSTRACT

A method for manufacturing a turbo fan unit includes a step for preparing multiple fan blades and an other-side side plate, and a step for connecting each of the multiple fan blades to the other-side side plate by a welding process. In the preparing step, one of the fan blade and the side plate is prepared, in which a connecting-surface forming portion having a connecting surface and a welding projection protruded from the connecting surface is formed. The connecting surface connects one of the fan blade and the side plate to the other one of the fan blade and the side plate. In the connecting step, the welding projection is melted down and the connecting surface is connected to an opposing surface, which is the surface of one of the fan blade and the side plate and which is opposing to the connecting surface.

7 Claims, 8 Drawing Sheets

FAN ROTATIONAL DIRECTION DRf

COMPARATIVE EXAMPLE

COMPARATIVE EXAMPLE

METHOD FOR MANUFACTURING TURBO FAN

CROSS REFERENCE TO RELATED APPLICATION

This application is a continuation application of International Patent Application No.PCT/JP2018/006457 filed on Feb. 22, 2018, which designated the U.S. and claims the benefit of priority from Japanese Patent Application No. 2017-065499 filed on Mar. 29, 2017. The entire disclosures of all of the above applications are incorporated herein by reference.

FIELD OF TECHNOLOGY

The present disclosure relates to a turbo fan applied to a blower device.

BACKGROUND

A closed-type turbo fan is known in the art, which is used in an air conditioning apparatus for an automotive vehicle. In the closed-type turbo fan, fan blades are surrounded by a shroud ring and a main plate. The fan blades, the shroud ring and the main plate are integrally welded to one another.

When the fan blades are welded to the main plate and a part of the fan blades is melted more than necessary, a part of the main plate may be protruded in a direction to blade passages, which are formed between neighboring fan blades and through air flows. When it occurs, air flow in the blade passages is disturbed by such a protruded portion and thereby noise is generated.

SUMMARY OF THE DISCLOSURE

It is an object of the present disclosure to provide a method for manufacturing a turbo fan, according to which it is possible to avoid a situation that a part of a main plate is protruded to blade passages.

BRIEF DESCRIPTION OF THE DRAWINGS

FIG. 8 is a schematic cross-sectional view showing the fan blade and the other-side side plate after the welding process, wherein FIG. 8 is the cross-sectional view taken along a line VIII-VIII in FIG. 9.

FIG. 9 is a schematic cross-sectional view showing the fan blade and the other-side side plate after the welding process, wherein FIG. 9 is an enlarged view showing a portion IX in FIG. 4.

DETAILED DESCRIPTION OF THE EMBODIMENTS

Figure 1:
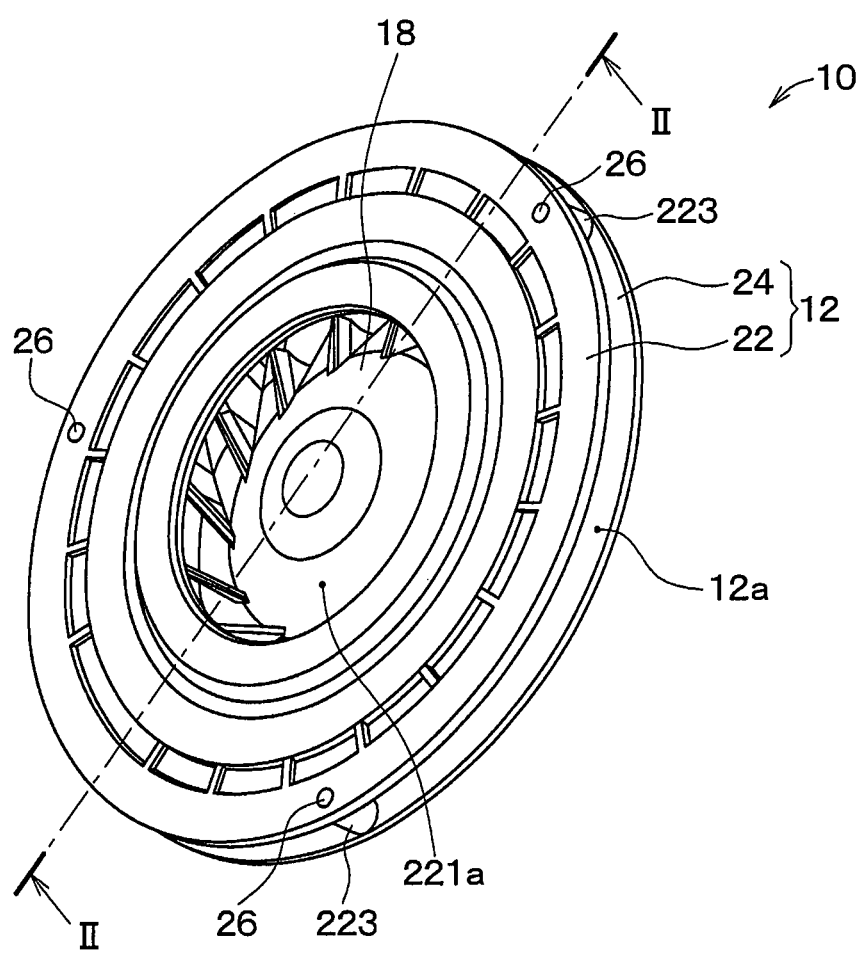
FIG. 1 is a schematic perspective view showing an appearance of a blower device of a first embodiment.

Embodiments of the present disclosure will be explained hereinafter with reference to the drawings. The same reference numerals are given to the same or similar structures and/or portions in each of the drawings in order to avoid repeated explanation.

First Embodiment

Figure 2:
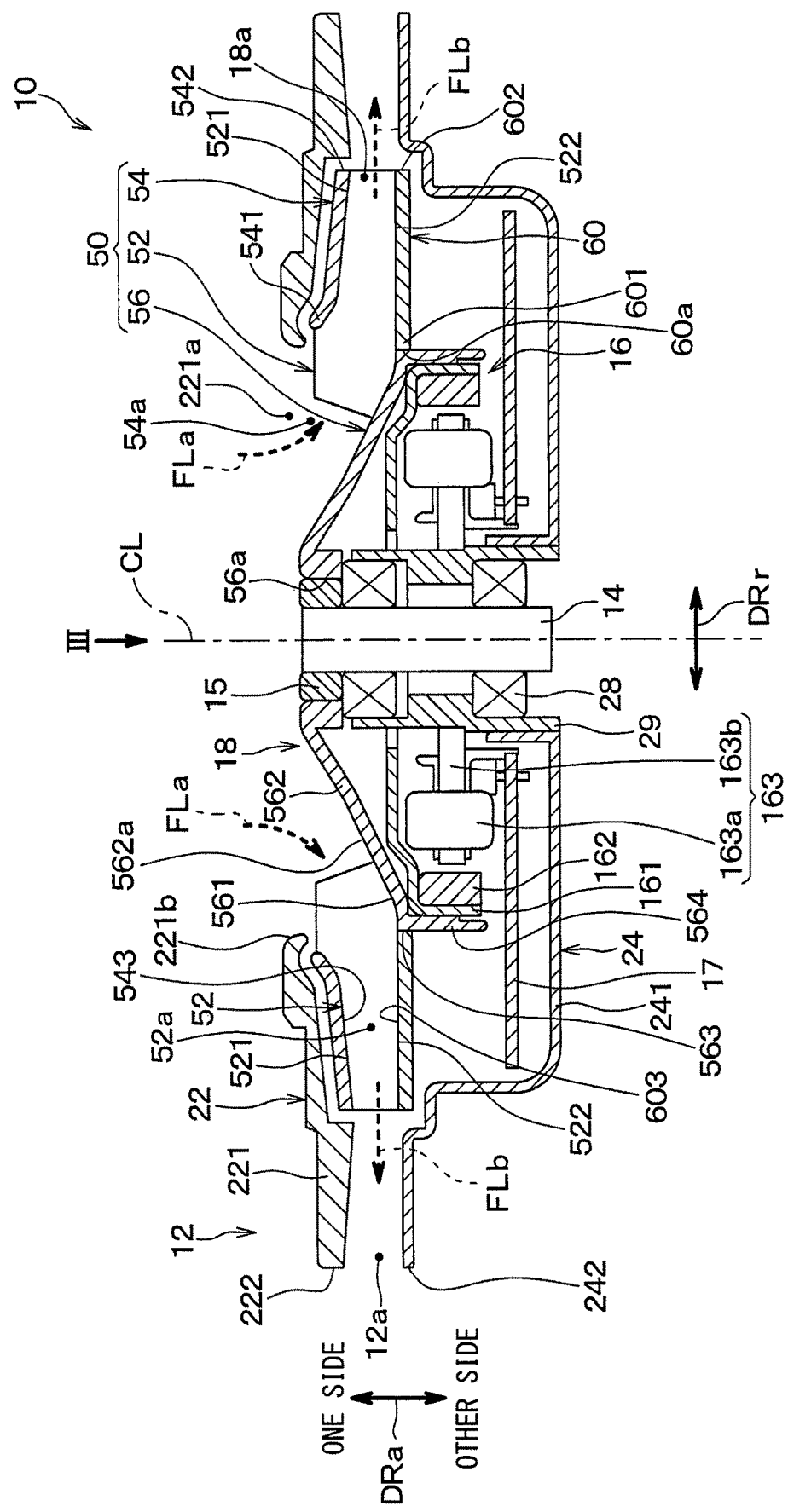
FIG. 2 is a schematic cross-sectional view taken along a line II-II in FIG. 1.

FIG. 1 is a schematic perspective view showing an appearance of a blower device 10 of a first embodiment. FIG. 2 is a schematic cross-sectional view of an axial direction showing the blower device 10, which is cut out by a plane having a fan center line CL. Namely, FIG. 2 is a cross-sectional view taken along a line II-II in FIG. 1. In FIG. 2, an arrow DRa is an axial direction of the fan center line CL, that is, a fan axial direction DRa. In addition, an arrow DRr in FIG. 2 is a radial direction of the fan center line CL, that is, a fan radial direction DRr.

As shown in FIGS. 1 and 2, the blower device 10 is a centrifugal blower device, more exactly, a turbo-type blower device. The blower device 10 includes a casing 12 which is a housing for the blower device 10, a rotating shaft 14, a shaft housing 15, an electric motor 16, an electronic circuit board 17, a turbo fan unit 18, bearings 28, a bearing housing 29 and so on.

The casing 12 protects the electric motor 16, the electronic circuit board 17 and the turbo fan unit 18 from dust and blot of an outside of the blower device 10. For that purpose, the casing 12 accommodates therein the electric motor 16, the electronic circuit board 17 and the turbo fan unit 18. The casing 12 has a first casing member 22 and a second casing member 24.

The first casing member 22 is made of, for example, resin. The first casing member 22 is formed in an almost disc shape having a diameter larger than that of the turbo fan unit 18. The first casing member 22 has a first cover portion 221, a first peripheral portion 222 and multiple supporting pillars 223.

The first cover portion 221 is arranged on one side of the turbo fan unit 18 in the fan axial direction DRa and covers one side of the turbo fan unit 18. A term for covering the turbo fan unit 18 means to cover at least a part of the turbo fan unit 18.

An air inlet opening 221*a* is formed at an inner peripheral side of the first cover portion 221, in such a way that the air inlet opening 221*a* penetrates the first cover portion 221 in the fan axial direction DRa. Air is sucked into the turbo fan unit 18 via the air inlet opening 221*a*. The first cover portion 221 has a bell-mouth portion 221*b*, which forms an outer periphery of the air inlet opening 221*a*. The bell-mouth portion 221*b* smoothly guides the air flowing from the outside of the blower device 10 into the air inlet opening 221*a*.

As shown in FIGS. 1 and 2, the first peripheral portion 222 forms an outer periphery of the first casing member 22 around the fan center line CL. Each of the supporting pillars 223 is protruded from the first cover portion 221 to the inside of the casing 12 in the fan axial direction DRa. Each of the supporting pillars 223 is formed in a cylindrical shape of a large thickness having a center axis extending in parallel to the fan center line CL. A screw hole is formed in an inside of the supporting pillar 223, so that a screw 26 is inserted into the screw hole for connecting the first casing member 22 and the second casing member 24 to each other.

Each of the supporting pillars 223 of the first casing member 22 is arranged at an outside of the turbo fan unit 18 in the fan radial direction DRr. The first casing member 22 and the second casing member 24 are connected to each other in a condition that a forward end of each supporting pillar 223 is brought into contact with the second casing member 24.

The second casing member 24 is formed in an almost disc shape having a diameter almost equal to that of the first casing member 22. The second casing member 24 is made of, for example, metal, such as, iron, stainless steel or resin. The second casing member 24 also functions as a motor housing for covering the electric motor 16 and the electronic circuit board 17. The second casing member 24 has a second cover portion 241 and a second peripheral portion 242.

The second cover portion 241 is arranged on the other side of the turbo fan unit 18 and the electric motor 16 in the fan axial direction DRa. The second cover portion 241 covers the other side of the turbo fan unit 18 and the electric motor 16. The second peripheral portion 242 forms an outer periphery of the second casing member 24 around the fan center line CL.

The first peripheral portion 222 and the second peripheral portion 242 form an air blow-out portion of the casing 12 for blowing out the air. An air blow-out opening 12*a* is formed between the first peripheral portion 222 and the second peripheral portion 242 in the fan axial direction DRa, through which the air blown out from the turbo fan unit 18 is discharged.

More exactly, the air blow-out opening 12*a* is formed at a side surface of the blower device 10. The air blow-out opening 12*a* is opened at an entire circumference of the casing 12 around the fan center line CL and blows out the air from the turbo fan unit 18. The air to be blown out from the casing 12 is blocked by the supporting pillars 223, in areas in which the supporting pillars 223 are provided. Therefore, the term "the air blow-out opening 12*a* is opened at the entire circumference of the casing 12" means that it is opened at almost entire circumference.

Each of the rotating shaft 14 and the shaft housing 15 is made of metal, such as, iron, stainless steel, brass or the like. The rotating shaft 14 is composed of a rod member, as shown in FIG. 2. The rotating shaft 14 is inserted into the shaft housing 15 and each of inner races of the bearings 28 and fixed thereto. Each of outer races of the bearings 28 is press-inserted into the bearing housing 29 and fixed thereto. The bearing housing 29 is made of metal, for example, such as aluminum alloy, brass, stainless steel or the like. The bearing housing 29 is fixed to the second cover portion 241.

As above, the rotating shaft 14 and the shaft housing 15 are supported by the second cover portion 241 via the bearings 29. In other words, the rotating shaft 14 and the shaft housing 15 are rotatable around the fan center line CL with respect to the second cover portion 241.

In an inside of the casing 12, the shaft housing 15 is fitted into an inner peripheral hole 56*a* of a boss portion 56 of the turbo fan unit 18. For example, the rotating shaft 14 and the shaft housing 15 are insert-molded in a fan main body 50 of the turbo fan unit 18, in a condition that the rotating shaft 14 and the shaft housing 15 are connected to each other in advance. Accordingly, the rotating shaft 14 and the shaft housing 15 are connected to the boss portion 56 of the turbo fan unit 18, so that the rotating shaft 14 and the shaft housing 15 are not rotatable with respect to the turbo fan unit 18. Namely, the rotating shaft 14 and the shaft housing 15 are integrally rotated with the turbo fan unit 18 around the fan center line CL.

The electric motor 16 is composed of a brushless DC motor of an outer-rotor type. The electric motor 16 and the electronic circuit board 17 are arranged between the boss portion 56 of the turbo fan unit 18 and the second cover portion 241 in the fan axial direction DRa. The electric motor 16 includes a motor rotor 161, a rotor magnet 162 and a motor stator 163. The motor rotor 161 is made of metal, such as steel sheets or the like. The motor rotor 161 is made by press forming of metal sheets.

The rotor magnet 162 is composed of a permanent magnet, for example, a rubber magnet including ferrite, neodymium or the like. The rotor magnet 162 is integrally fixed to the motor rotor 161. The motor rotor 161 is fixed to the boss portion 56 of the turbo fan unit 18. Accordingly, the motor rotor 161 and the rotor magnet 162 are integrally rotated with the turbo fan unit 18 around the fan center line CL.

The motor stator 163 includes a stator coil 163*a* electrically connected to the electronic circuit board 17 and a stator core 163*b*. The motor stator 163 is arranged at a radial-inside position with a small gap with the rotor magnet 162. The motor stator 163 is fixed to the second cover portion 241 of the second casing member 24 via the bearing housing 29.

In the electric motor 16 having the above structure, flux change is generated in the stator core 163*b* by the stator coil 163*a*, when electric power is supplied to the stator coil 163*a* of the motor stator 163 from an outside power source. The flux change in the stator core 163*b* generates an attracting force for the rotor magnet 162. The motor rotor 161 is rotatably supported by the rotating shaft 14 via the bearings 28. Therefore, when the motor rotor 161 receives the attracting force for the rotor magnet 162, the motor rotor 161 is rotated around the fan center line CL. Accordingly, when the electric power is supplied to the electric motor 16, the turbo fan unit 18 fixed to the motor rotor 161 is rotated around the fan center line CL.

Figure 3:
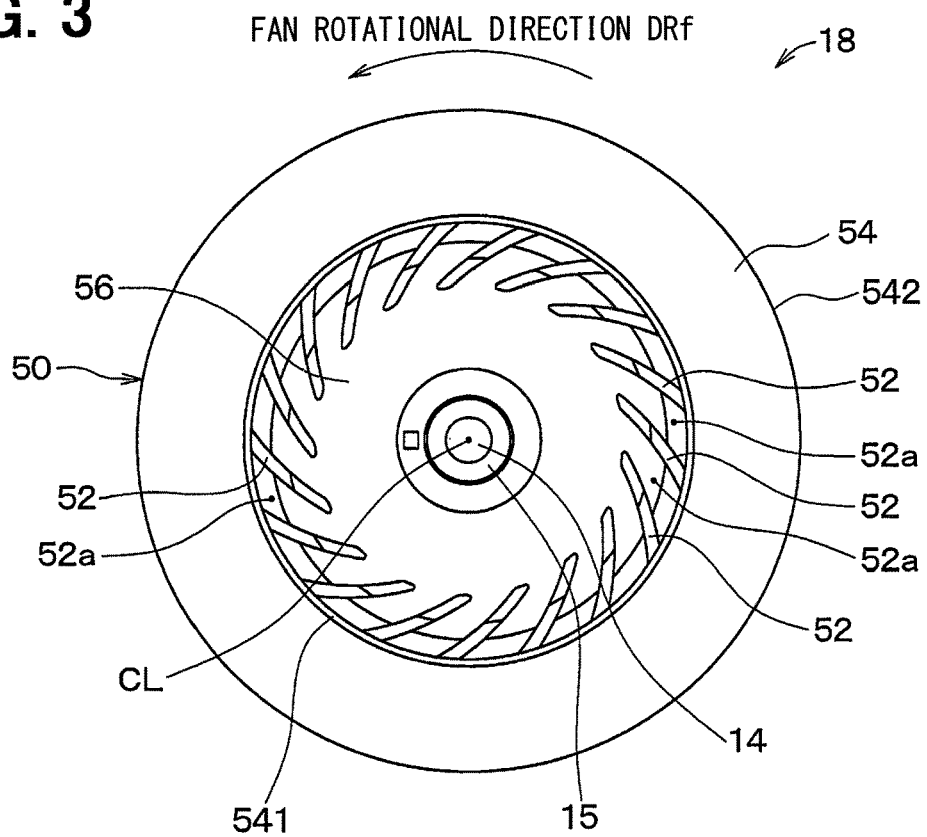
FIG. 3 is a schematic view when viewed in a direction III in FIG. 2, wherein a turbo fan unit, a rotating shaft, and a shaft housing are extracted.

As shown in FIGS. 2 and 3, the turbo fan unit 18 is an impeller applied to the blower device 10. The turbo fan unit 18 blows out the air when it is rotated around the fan center line CL in a predetermined fan rotational direction DRf. In other words, when the turbo fan unit 18 is rotated around the fan center line CL, the air is drawn into the inside from the one side of the fan axial direction DRa via the air inlet opening 221a, as indicated by an arrow FLa. Then, the blower device 10 blows out the air drawn into the inside to the outside of the turbo fan unit 18, as indicated by an arrow FLb.

More exactly, the turbo fan unit 18 includes the fan main body 50 and an other-side side plate 60. The fan main body 50 includes multiple fan blades 52, a shroud ring 54 and the boss portion 56. The fan main body 50 is made of, for example, resin by one injection molding process. Accordingly, the multiple fan blades 52, the shroud ring 54 and the boss portion 56 are integrally formed with one another and each of them is made of the same resin. In addition, since the fan main body 50 is an integrally molded component, there are no welding portions between the multiple fan blades 52 and the shroud ring 54, at which the both parts are welded to each other. In addition, there are no welding portions between the multiple fan blades 52 and the boss portion 56, at which the both parts are welded to each other.

The multiple fan blades 52 are arranged around the fan center line CL. More exactly, the multiple fan blades 52 are arranged at intervals in a circumferential direction of the fan center line CL in such a manner that a space for air flow is respectively formed between the neighboring fan blades.

Each of the fan blades 52 has a one-side blade end 521, which is formed in the fan blade 52 on the one side of the fan axial direction DRa, and an other-side blade end 522, which is formed in the fan blade 52 on the other side of the fan axial direction DRa, that is, on the opposite side to the one side.

As shown in FIG. 3, the multiple fan blades 52 respectively form blade passages 52a between the neighboring fan blades 52, so that the air flows through each of the blade passages 52a.

As shown in FIGS. 2 and 3, the shroud ring 54 is formed in a disc shape extending in the fan radial direction DRr. A fan-side air suction port 54a is formed at an inner peripheral side of the shroud ring 54. The air from the air inlet opening 221a of the casing 12 is sucked into the inside via the fan-side air suction port 54a, as indicated by the arrow FLa. The shroud ring 54 is formed in an annular shape.

The shroud ring 54 has a ring-side inner peripheral end 541 and a ring-side outer peripheral end 542. The ring-side inner peripheral end 541 is an inner end portion of the shroud ring 54 in the fan radial direction DRr and forms the fan-side air suction port 54a. The ring-side outer peripheral end 542 is an outer end portion of the shroud ring 54 in the fan radial direction DRr.

The shroud ring 54 is arranged at the one side of each fan blade 52 in the fan axial direction DRa, that is, on a side of the air inlet opening 221a. The shroud ring 54 is connected to each of the fan blades 52. In other words, the shroud ring 54 is connected to the one-side blade end 521 of each fan blade 52.

As shown in FIGS. 2 and 3, the boss portion 56 is connected to the rotating shaft 14, which is rotatable around the fan center line CL, via the shaft housing 15. The boss portion 56 is rotatably supported by the casing 12, which is a non-rotatable part of the blower device 10, so that the boss portion 56 is rotatable around the fan center line CL.

In addition, the boss portion 56 is connected to each of the fan blades 52 at a position opposite to the shroud ring 54. More exactly, an entire portion of a blade connecting portion 561 of the boss portion 56 to be connected to the fan blades 52 is located at a position inside of an entire portion of the shroud ring 54 in the fan radial direction DRr. In other words, the boss portion 56 is connected to each of the fan blades 52 at a position inside of the other-side blade end 522 in the fan radial direction DRr. Each of the fan blades 52 has a function as a connecting rib for bridging the boss portion 56 and the shroud ring 54 with each other. Accordingly, it is possible to integrally mold the multiple fan blades 52, the boss portion 56 and the shroud ring 54 with one another.

The boss portion 56 has a boss-side guide surface 562a for guiding the air flow in the turbo fan unit 18. The boss-side guide surface 562a has a curved surface for guiding the air flow, which is sucked into the air inlet portion 221a in the fan axial direction DRa, to an outward direction of the fan radial direction DRr.

The boss portion 56 has a boss-side guide portion 562 having the boss-side guide surface 562a. The boss-side guide portion 562 forms the boss-side guide surface 562a on the one side of the boss-side guide portion 562 in the fan axial direction DRa. The boss-side guide portion 562 guides the air flow, which is sucked from the fan-side air suction port 54a, in a direction from the inside to the outside of the fan radial direction DRr. Accordingly, in the present embodiment, the boss-side guide portion 562 forms an air-flow guide portion.

The inner peripheral hole 56a is formed at an inner periphery of the boss portion 56 for fixing the boss portion 56 to the rotating shaft 14. The inner peripheral hole 56a penetrates the boss portion 56 in the fan axial direction DRa.

In addition, the boss portion 56 has a boss-side outer peripheral end 563 and an annular wall portion 564 of an annular shape. The boss-side outer peripheral end 563 is an end portion of the boss portion 56, which is located at an outer position thereof in the fan radial direction DRr. More exactly, the boss-side outer peripheral end 563 is the end portion for forming the outer periphery of the boss-side guide portion 562.

The annular wall portion 564 extends from the boss-side outer peripheral end 563 to the other side of the fan axial direction DRa. The annular wall portion 564 is a cylindrical portion extending from the other-side blade end 522 to the other side of the fan axial direction DRa. The motor rotor 161 is fitted into an inside of the annular wall portion 564. Namely, the annular wall portion 564 has a function as a rotor accommodating portion for accommodating the motor rotor 161. When the annular wall portion 564 is fixed to the motor rotor 161, the boss portion 56 is fixed to the motor rotor 161.

The other-side side plate 60 extends in the fan radial direction DRr in a disc shape. A side-plate insertion hole 60a is formed at an inner peripheral side of the other-side side plate 60, wherein the side-plate insertion hole 60a penetrates the other-side side plate 60 in its thickness direction. Therefore, the other-side side plate 60 has an annular shape. The other-side side plate 60 is, for example, a resin-molded member separately formed from the fan main body 50.

In addition, the other-side side plate 60 is connected to each of the other-side blade ends 522 of the multiple fan blades 52, in a condition that the other-side side plate 60 is fitted to the boss portion 56 at its outside in the fan radial direction DRr. The other-side side plate 60 and the multiple fan blades 52 are connected to each other by a vibration welding process or a thermal welding process. Therefore, thermoplastic material is preferably selected as the material for the other-side side plate 60 and the multiple fan blade 52, in view of bonding property by the welding process for the other-side side plate 60 and the fan main body 50. More exactly, the material of the same sort is preferable.

When the other-side side plate 60 is fixed to the multiple fan blades 52, the turbo fan unit 18 is completed as a closed fan. The closed fan is a turbo fan, in which both axial sides of each blade passage 52a formed between the respective neighboring fan blades 52 are covered by the shroud ring 54 and the other-side side plate 60 in the fan axial direction DRa. Therefore, the shroud ring 54 has a ring-side guide surface 543, which faces the blade passages 52a and guides the air flow in the blade passages 52a. In addition, the other-side side plate 60 has a plate-side guide surface 603, which faces the blade passages 52a and guides the air flow in the blade passages 52a.

The plate-side guide surface 603 is opposed to the ring-side guide surface 543 across the blade passages 52a and arranged at a position outside of the boss-side guide surface 562a in the fan radial direction DRr. The plate-side guide surface 603 has a function for smoothly guiding the air flow flowing from the boss-side guide surface 562a to a fan-side air blow-out opening 18a.

The other-side side plate 60 has a plate-side inner peripheral end 601 and a plate-side outer peripheral end 602. The plate-side inner peripheral end 601 is a portion of the other-side side plate 60 formed at an inside thereof in the fan radial direction DRr. The plate-side inner peripheral end 601 forms the side-plate insertion hole 60a. The plate-side outer peripheral end 602 is a portion of the side plate 60 formed at an outside thereof in the fan radial direction DRr.

The plate-side outer peripheral end 602 and the ring-side outer peripheral end 542 are separately arranged from each other in the fan axial direction DRa. The plate-side outer peripheral end 602 and the ring-side outer peripheral end 542 form the fan-side air blow-out opening 18a between the plate-side outer peripheral end 602 and the ring-side outer peripheral end 542, wherein the air passing through the blade passages 52a is blown out from the fan-side air blow-out opening 18a.

Figure 4:
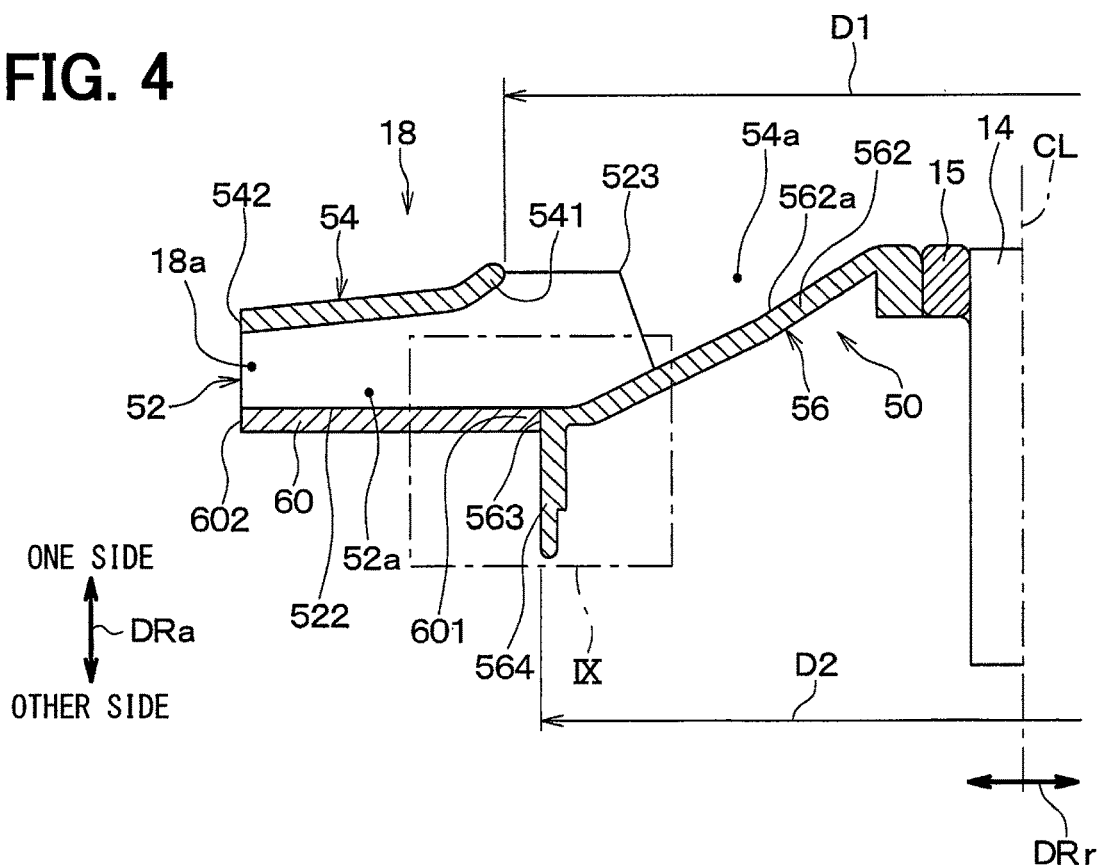
FIG. 4 is a schematic cross-sectional view for explaining a detailed shape of the turbo fan unit of FIG. 2 and showing a half portion of a left-hand side, wherein the turbo fan unit, the rotating shaft and the shaft housing are extracted.

As shown in FIG. 4, each of the multiple fan blades 52 has a front-side blade edge 523. The front-side blade edge 523 is an end portion of the fan blade 52, which is formed at an upstream side of the air flow flowing through the blade passages 52a between the respective fan blades 52 after passing through the fan-side air suction port 54a. The front-side blade edge 523 is protruded to the inside of the ring-side inner peripheral end 541 in the fan radial direction DRr. In other words, the front-side blade edge 523 is protruded to the inside of the boss-side outer peripheral end 563 in the fan radial direction DRr.

As shown in FIGS. 2 and 3, the turbo fan unit 18 having the above structure is rotated together with the motor rotor 161 in the fan rotating direction DRf. Then, the fan blades 52 of the turbo fan unit 18 give quantity of motion to the air. The turbo fan unit 18 thereby blows out the air from the fan-side air blow-out opening 18a, which is opened at an outer periphery of the turbo fan unit 18, to a radial outside thereof. The air sucked from the fan-side air suction port 54a and pushed out by the fan blades 52, that is, the air blown out from the fan-side air blow-out opening 18a, is discharged to the outside of the blower device 10 via the air blow-out opening 12a formed in the casing 12.

Figure 5:
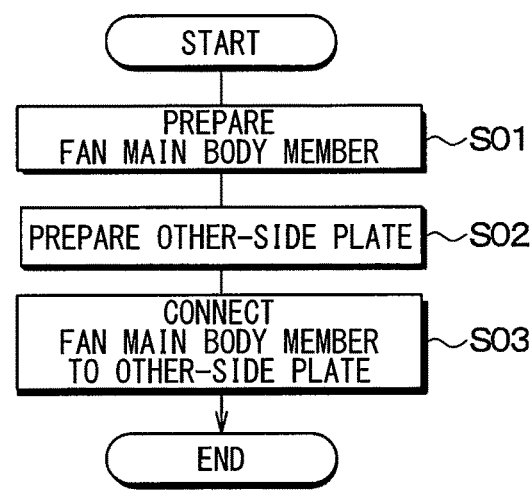
FIG. 5 is a flowchart showing a manufacturing process of the turbo fan unit according to the first embodiment.

A method for manufacturing the turbo fan unit 18 will be explained with reference to a flowchart of FIG. 5. As shown in FIG. 5, in a first step S01, which is a molding step for preparing the fan main body, the fan main body 50 is molded. Namely, the multiple fan blades 52, the shroud ring 54 and the boss portion 56, which are components for the fan main body 50, are integrally molded. More exactly, the multiple fan blades 52, the shroud ring 54 and the boss portion 56 are integrally molded by an injection molding process, in which molding dies to be opened and closed in the fan axial direction DRa are used.

As shown in FIG. 4, a maximum outer diameter D2 of the boss portion 56 is smaller than a minimum inner diameter D1 of the shroud ring 54. In other words, the boss portion 56 is entirely arranged at a position inside of the ring-side inner peripheral end 541 in the fan radial direction DRr. Therefore, it is possible to easily and integrally mold the multiple fan blades 52, the shroud ring 54 and the boss portion 56, when the molding dies are opened and closed in the fan axial direction DRa.

In the flowchart of FIG. 5, the process goes to a step S02 after the step S01. In the step S02 for molding the other-side side plate, the other-side side plate 60 is prepared by, for example, the injection molding process. Either one of the step S01 and the step S02 may be carried out at first.

The process goes to a step S03 after the step S02. In the step S03 of a connecting step, the other-side side plate 60 shown in FIG. 2 is fitted to the radial-outside portion of the boss portion 56. At the same time, the other-side side plate 60 is connected to each of the other-side blade ends 522 of the fan blades 52. The connecting step between the fan blades 52 and the other-side side plate 60 is carried out by the vibration welding process or the thermal welding process. When the step S03 is finished, the turbo fan unit 18 is completed.

Figure 6:
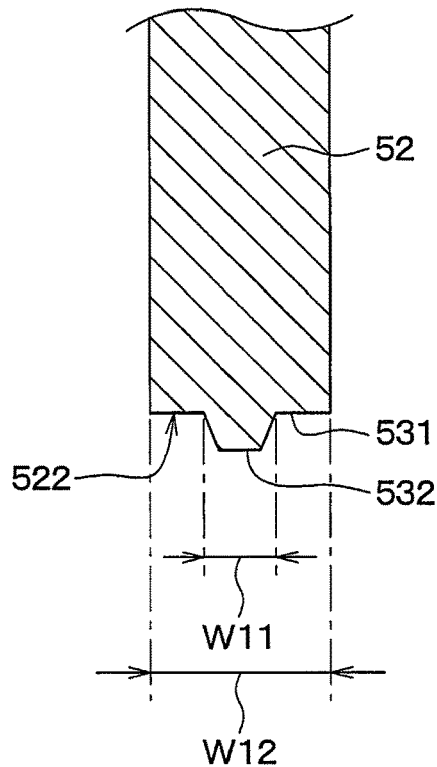
FIG. 6 is a schematically enlarged cross-sectional view showing an other-side blade end of a fan blade before a welding process.

The connecting step between the multiple fan blades 52 and the other-side side plate 60 will be explained more in detail. In the step S01, as shown in FIG. 6, a blade-side connecting surface 531 and a blade-side welding projection 532 are formed in the other-side blade end 522 of each fan blade 52.

The blade-side connecting surface 531 is a connecting surface to be connected to the other-side side plate 60. The blade-side connecting surface 531 is formed in the other-side blade end 522. Therefore, the other-side blade end 522 forms a blade-side surface forming portion having the blade-side connecting surface 531. In the present embodiment, the other-side blade end 522 forms the connecting-surface forming portion, which is formed in one of the fan blade and the other-side side plate and in which the connecting surface is formed for connecting the one of the fan blade and the other-side side plate to the other one of the fan blade and the other-side side plate.

The blade-side welding projection 532 is projected from the blade-side connecting surface 531. The blade-side welding projection 532 is a part of the fan blade, which is melted down in the welding process. One blade-side welding projection 532 is provided in each of the multiple fan blades 52.

The blade-side welding projection 532 is located at a center position in a width direction of each of the fan blades 52. The width direction of the fan blade 52 is a direction perpendicular to a blade extending direction from the inside to the outside of the fan radial direction DRr and perpendicular to the fan axial direction DRa. A width W11 of the blade-side welding projection 532 in the width direction is smaller than a width W12 of the other-side blade end 522 of the fan blade 52 in the width direction.

In addition, although not shown in the drawings, the blade-side welding projection 532 extends in each of the other-side blade end 522 for an entire range from the front-side blade edge 523 to a rear-side blade edge, in an area to be connected to the other-side side plate 60. The rear-side blade edge is an end of the fan blade 52, which is formed at a downstream side of the air-flow direction of the air flowing through the blade passages 52a after passing through the fan-side air suction port 54a.

As above, the multiple fan blades 52 are prepared, each of which has the blade-side connecting surface 531 formed in the other-side blade end 522 and the blade-side welding projection 532.

Figure 7:
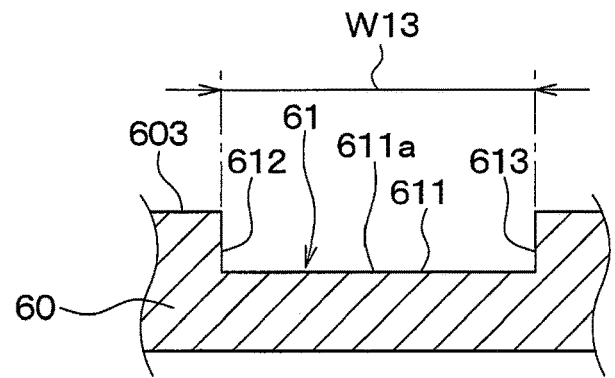
FIG. 7 is a schematic cross-sectional view showing an other-side side plate before the welding process.

In the step S02, as shown in FIG. 7, multiple recessed portions 61 are formed in the other-side side plate 60. The multiple recessed portions 61 are formed in a part of the plate-side guide surface 603. Therefore, the multiple recessed portions 61 are formed in the other-side side plate 60 on its side opposing to the multiple fan blades 52. Each of the multiple recessed portions 61 has a bottom surface 611 and side surfaces 612 and 613 located at both sides of the bottom surface 611. A width W13 between the side surfaces 612 and 613 is larger than the width W12 of the other-side blade end 522 of each fan blade 52.

As above, the other-side side plate 60 having the multiple recessed portions 61 is prepared.

Figure 8:
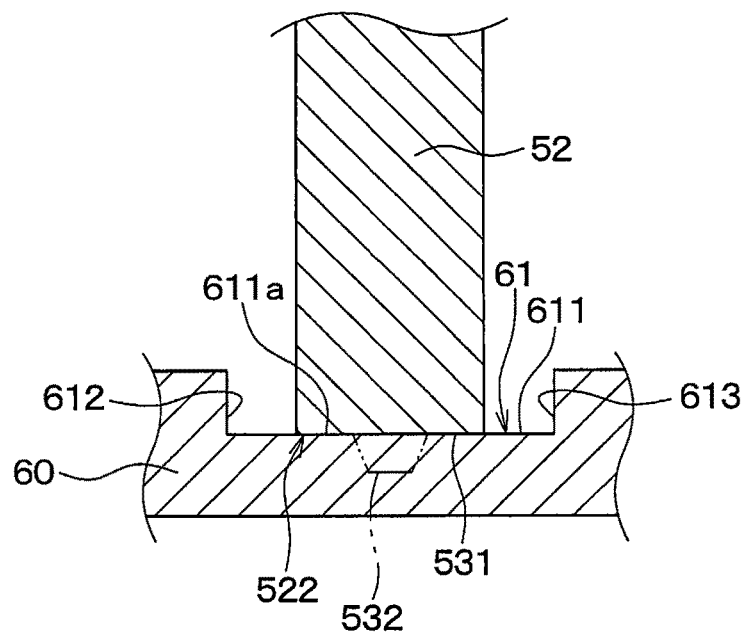

In the step S03, as shown in FIG. 8, the other-side blade end 522 of each fan blade 52 is located in an inside of each recessed portion 61 of the other-side side plate 60. In this condition, each of the blade-side welding projections 532 is melted down. Each of the blade-side connecting surfaces 531 is connected to a part 611a of the bottom surface 611 of the respective recessed portion 61. The part 611a of the bottom surface 611 is an opposing surface, which is opposed to the blade-side connecting surface 531. In FIG. 8, the blade-side welding projection 532 is indicated. However, in reality, the blade-side welding projection 532 no longer exists after the welding process, because the blade-side welding projection 532 is melted down in the welding process.

Figure 9:
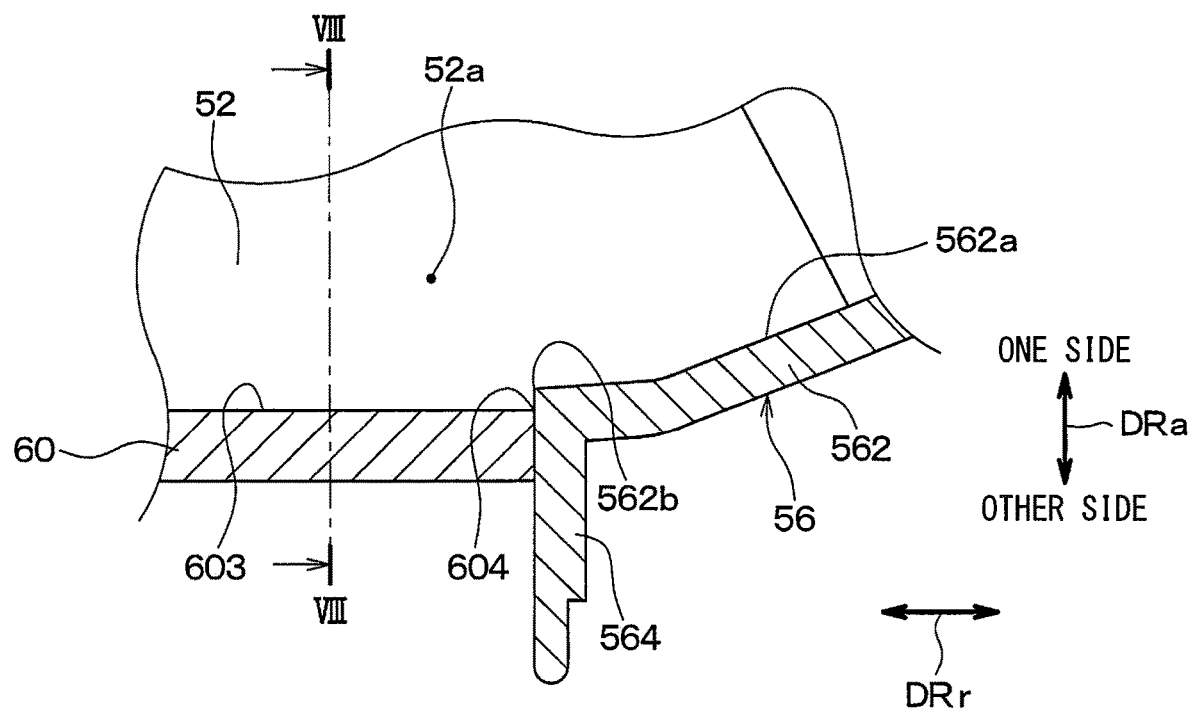

As above, each of the multiple fan blades 52 is connected to the other-side side plate 60. As shown in FIG. 9, an inner peripheral end 604 of the plate-side guide surface 603 in the fan radial direction DRr is located at a position closer to the other side of the fan axial direction DRa than an outer peripheral end 562b of the boss-side guide surface 562a in the fan radial direction DRr.

Figure 10:
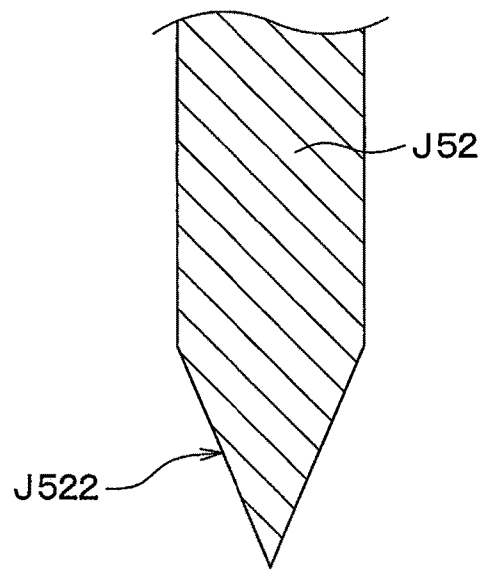
FIG. 10 is a schematic cross-sectional view showing an other-side blade end of a fan blade after the welding process according to a comparison example 1.
Figure 11:
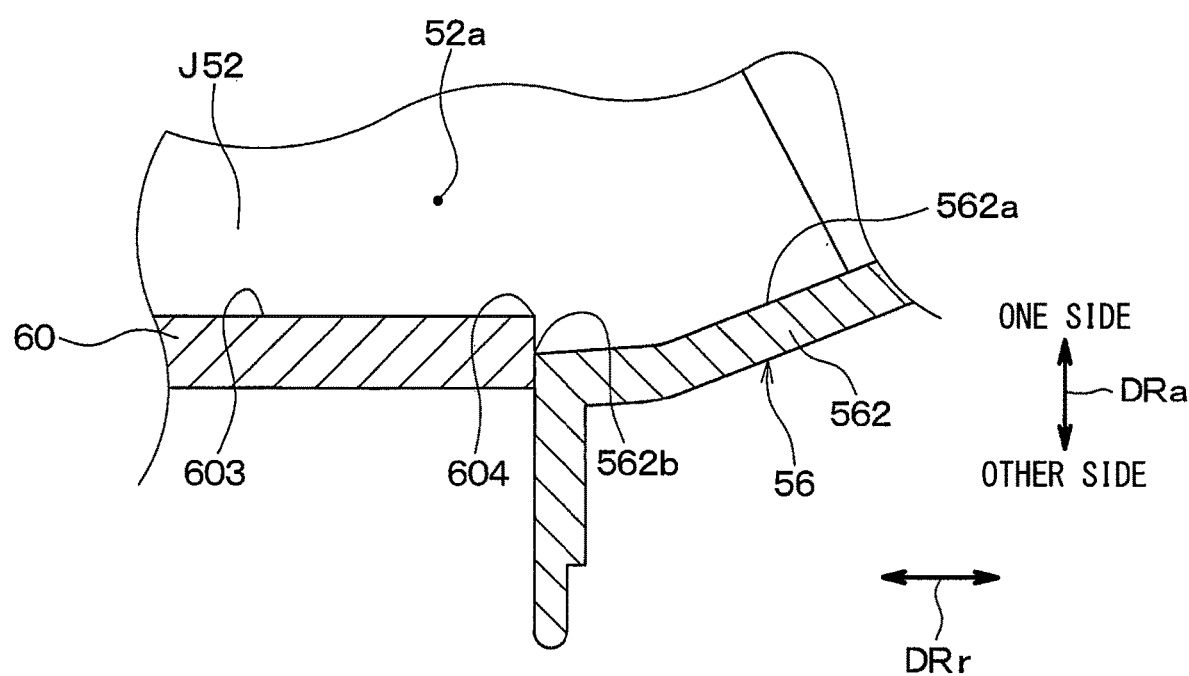
FIG. 11 is a schematic cross-sectional view showing the fan blade and the other-side side plate of the comparison example 1 after the welding process, wherein FIG. 11 corresponds to FIG. 9.

In a case that each of other-side blade ends J522 of multiple fan blades J52 has a taper shape, as shown in a comparison example 1 of FIG. 10, the other-side blade end J522 is melted down more than necessary, before the other-side blade end J522 is melted and welded. Then, as shown in FIG. 11, the other-side side plate 60 is protruded to the inside of the blade passage 52a. The inventors of the present disclosure have found out that there is a problem, according to which noise is generated when the air flow is disturbed in the blade passage 52a.

On the other hand, according to the present embodiment, as shown in FIG. 6, the blade-side welding projection 532 projecting from the blade-side connecting surface 531 is formed in each of the multiple fan blades 52. The width W12 of the other-side blade end 522 having the blade-side connecting surface 531 is larger than the width W11 of the blade-side welding projection 532. In other words, when comparing following volumes of the same height, the volume of the other-side blade end 522 excluding the blade-side welding projection 532 is larger than the volume of the blade-side welding projection 532. An energy amount necessary for melting the other-side blade end 522 excluding the blade-side welding projection 532 is much larger than an energy amount necessary for melting the blade-side welding projection 532.

Therefore, the blade-side welding projection 532 is melted down by the energy amount, with which the blade-side welding projection 532 can be melted down but the other-side blade end 522 excluding the blade-side welding projection 532 cannot be melted down. According to this, it is possible to melt the blade-side welding projection 532 and to prevent the other-side blade end 522 excluding the blade-side welding projection 532 from being melted down more than necessary.

As a result, when the multiple fan blades 52 and the other-side side plate 60 are connected to each other by the welding process, as shown in FIG. 9, it is possible to locate the inner peripheral end 604 of the plate-side guide surface 603 in the fan radial direction DRr at a position of the other side in the fan axial direction DRa, which is closer to the other side of the fan axial direction DRa than the outer peripheral end 562b of the boss-side guide surface 562a. In other words, it is possible to prevent the other-side side plate 60 from being protruded into the inside of the blade passage 52a. Accordingly, it is possible to suppress the disturbance of the air flow in the blade passages 52a. It is possible to suppress the generation of the noise.

In addition, according to the present embodiment, as shown in FIGS. 7 and 8, the multiple recessed portions 61 are formed in the other-side side plate 60. According to this structure, resin melt of the blade-side welding projection 532 spreading out from the blade-side connecting surface 531 remains in the inside of the recessed portion 61, when the multiple fan blades 52 and the other-side side plate 60 are connected to each other by the welding process. Therefore, it is possible to prevent a burr from being protruded to the blade passage 52a.

In the present embodiment, the multiple recessed portions 61 are formed in the other-side side plate 60. However, it is not always necessary to form the recessed portions 61. Even in such a case, the effect achieved by the blade-side welding projection 532 can be obtained.

Second Embodiment

The present embodiment differs from the first embodiment in the position of the welding projection.

Figure 12:
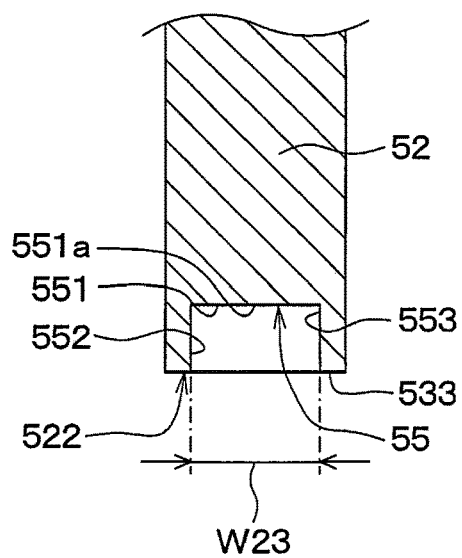
FIG. 12 is a schematic cross-sectional view showing an other-side blade end of a fan blade according to a second embodiment before the welding process.

In the present embodiment, in the above step S01, as shown in FIG. 12, a recessed portion 55 is formed in each of the other-side blade ends 522. Each of the recessed portions 55 of the multiple fan blades 52 is formed in a surface 533, which is the surface of the other-side blade end 522 to be connected to the other-side side plate 60. Therefore, each of the recessed portions 55 of the multiple fan blades 52 is formed on the side of the fan blade, which is connected to the other-side side plate 60. Each of the recessed portions 55 of the multiple fan blades 52 has a bottom surface 551 and side surfaces 552 and 553 located at both sides of the bottom surface 551. A width W23 between the both side surfaces 552 and 553 of the fan blade 52 is larger than a width W22 of a plate-side surface forming portion 62 (explained below).

As above, the multiple fan blades 52 each having the recessed portion 55 are prepared.

Figure 13:
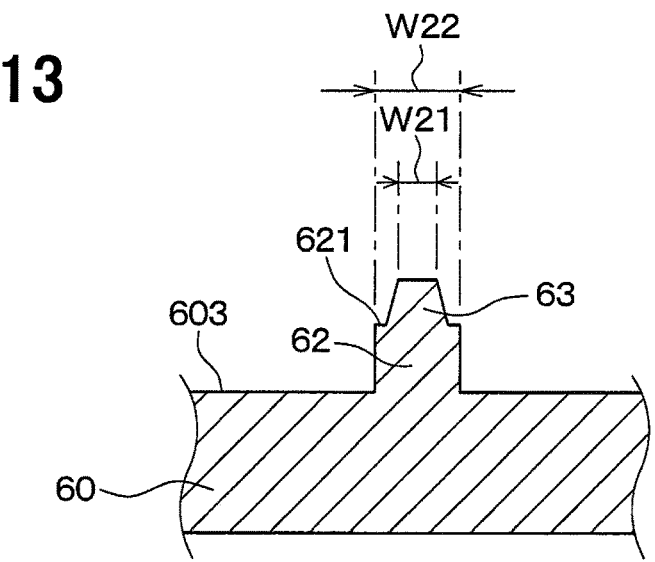
FIG. 13 is a schematic cross-sectional view showing an other-side side plate according to the second embodiment before the welding process.

In the above step S02, as shown in FIG. 13, the multiple plate-side surface forming portions 62 and multiple plate-side welding projections 63 are formed in the other-side side plate 60. Each of the plate-side surface forming portions 62 is protruded from the plate-side guide surface 603. The plate-side guide surface 603 is the surface of the other-side side plate 60, to which the multiple fan blades 52 are connected. In each of top portions of the plate-side surface forming portions 62, a plate-side connecting surface 621 is formed, which is connected to each of the multiple fan blades 52. In the present embodiment, each of the plate-side surface forming portions 62 forms a connecting-surface forming portion in one of the fan blade and the other-side side plate, wherein the connecting surface connects the one of the fan blade and the other-side side plate to the other one of the fan blade and the other-side side plate.

Each of the plate-side welding projections 63 is protruded from each of the plate-side connecting surfaces 621 of the plate-side surface forming portions 62. The plate-side welding projection 63 is a part of the connecting-surface forming portion, which is melted down in the welding process. One plate-side welding projection 63 is provided in each area of the other-side side plate 60, in which the other-side side plate 60 is connected to each of the multiple fan blades 52.

Each of the plate-side surface forming portions 62 is provided in the area, in which the other-side side plate 60 is connected to each of the fan blades 52, at a center position thereof in a width direction of the fan blade 52. The plate-side welding projection 63 is provided at a center position of the plate-side surface forming portion 62 in the width direction of the fan blade 52. A width W21 of the plate-side welding projection 63 is smaller than the width W22 of the plate-side surface forming portion 62 in the width direction of the fan blade 52.

In addition, each of the plate-side surface forming portion 62 and the plate-side welding projection 63 extends entirely from the inside to the outside of the fan radial direction DRr in the area, in which the other-side side plate 60 is connected to each of the multiple fan blades 52.

As above, the other-side side plate 60 having the multiple plate-side surface forming portions 62 and the multiple plate-side welding projections 63 are prepared.

Figure 14:
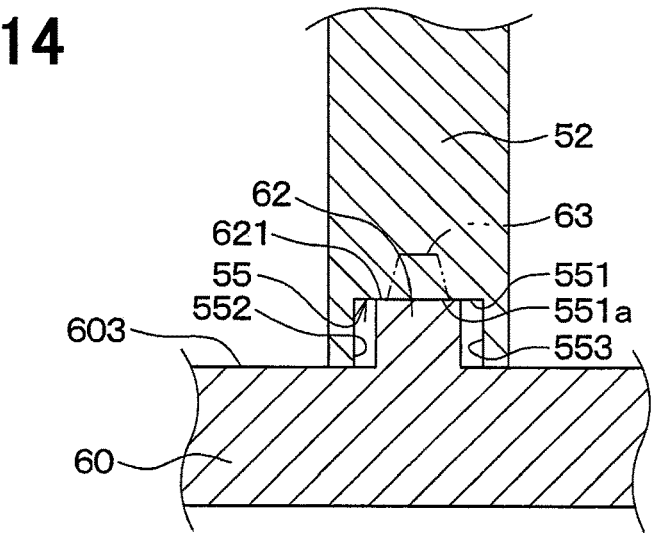
FIG. 14 is a schematic cross-sectional view showing the fan blade and the other-side side plate according to the second embodiment after the welding process.

In the above step S03, as shown in FIG. 14, each of the plate-side surface forming portions 62 is arranged in the inside of the respective recessed portion 55 of the fan blade 52. In such a condition, each of the plate-side welding projections 63 is melted down.

Each of the plate-side connecting surfaces 621 of the plate-side surface forming portions 62 is connected to a part 551a of the bottom surface 551 of the respective recessed portion 55 of each fan blade 52. The part 551a of the bottom surface 551 is an opposing surface opposing to the plate-side connecting surface 621. In FIG. 14, the plate-side welding projection 63 is indicated. However, in reality, the plate-side welding projection 63 no longer exists after the welding process, because the plate-side welding projection 63 is melted down in the welding process.

As above, the multiple fan blades 52 are connected to the other-side side plate 60. As shown in FIG. 9, the inner peripheral end 604 of the plate-side guide surface 603 in the fan radial direction DRr is located at the position closer to the other side of the fan axial direction DRa than the outer peripheral end 562b of the boss-side guide surface 562a in the fan axial direction DRa.

As explained above, according to the present embodiment, as shown in FIG. 13, the plate-side welding projection 63, which is protruded from the plate-side connecting surface 621, is provided in each of the plate-side surface forming portions 62. Therefore, due to the same reason in the first embodiment, the plate-side welding projection 63 is melted down by use of the energy amount, with which the plate-side welding projection 63 can be melted but the plate-side surface forming portion 62 excluding the plate-side welding projection 63 cannot be melted down. Accordingly, it is possible to melt down the plate-side welding projection 63 and to avoid a situation that the plate-side surface forming portion 62 excluding the plate-side welding projection 63 is melted down more than necessary. Therefore, in a similar manner to the first embodiment, it is possible to prevent the other-side side plate 60 from being protruded into the inside of the blade passage 52a.

In addition, according to the present embodiment, as shown in FIGS. 12 and 14, the recessed portion 55 is formed in the other-side blade end 522. According to this structure, resin melt of the plate-side welding projection 63 spreading out from the plate-side connecting surface 621 remains in the inside of the recessed portion 55, when the multiple fan blades 52 and the other-side side plate 60 are connected to each other by the welding process. Therefore, it is possible to prevent the burr from being protruded to the blade passage 52a.

In the present embodiment, the recessed portion 55 is formed in each of the other-side blade ends 522 of the multiple fan blades 52. However, it is not always necessary to form the recessed portions 55. Even in such a case, the effect achieved by the plate-side welding projection 63 can be obtained.

Third Embodiment

Figure 15:
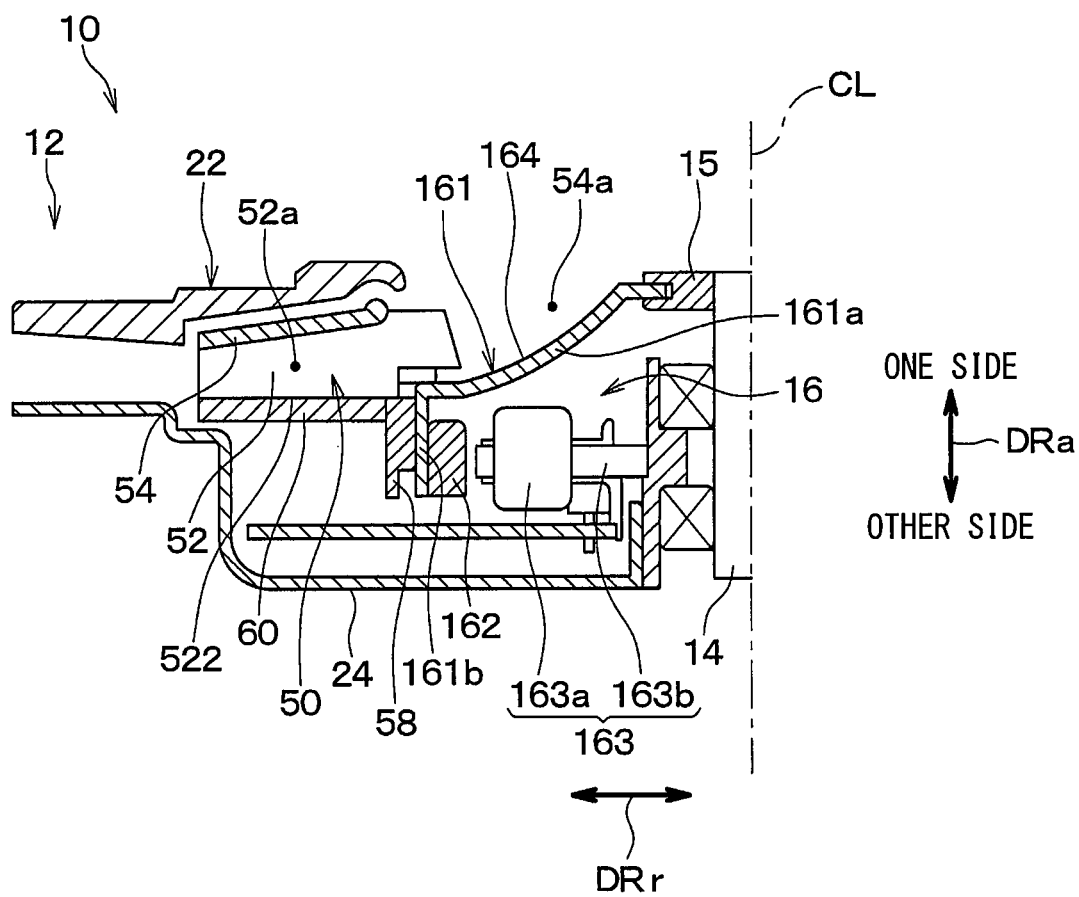
FIG. 15 is a schematically enlarged cross-sectional view showing a blower device according to a third embodiment.

The present embodiment differs from the first embodiment in the structure of the fan main body 50. As shown in FIG. 15, the fan main body 50 includes the multiple fan blades 52, the shroud ring 54 and a cylindrical member 58. The multiple fan blades 52, the shroud ring 54 and the cylindrical member 58 are formed as an integrally molded component.

The cylindrical member 58 has a cylindrical shape around the fan center line CL. The cylindrical member 58 is located at a position inside of the other-side side plate 60 in the fan radial direction DRr. The cylindrical member 58 is connected to the other-side side plate 60. The cylindrical member 58 extends in a cylindrical form from the other-side blade end 522 to the other side of the fan axial direction DRa. The motor rotor 161 is accommodated in an inside of the cylindrical member 58. In other words, the cylindrical member 58 works as a rotor accommodating portion for accommodating the motor rotor 161.

The motor rotor 161 has a rotor main body 161a and a rotor-side outer peripheral portion 161b. The rotor main body 161a is formed in a disc shape having an opening at its center. The rotor main body 161a has a shape, in which a surface position is displaced to the other side of the fan axial direction DRa as the surface position is moved from the inside to the outside of the fan radial direction DRr. The opening of the rotor main body 161a is firmly fitted to the shaft housing 15. According to this structure, the motor rotor 161 is fixed to the shaft housing 15.

A surface of the rotor main body 161a on the one side of the fan axial direction DRa forms an air-flow guide surface 164 for guiding the air flow. The air-flow guide surface 164 guides the air sucked from the fan-side air suction port 54a in a direction from the inside to the outside of the fan radial direction DRr. Therefore, in the present embodiment, the rotor main body 161a forms an air-flow guide portion.

The rotor-side outer peripheral portion 161b is located at an outer peripheral end of the rotor main body 161a in the fan radial direction DRr. The rotor-side outer peripheral portion 161b extends in a cylindrical shape from the outer peripheral end of the rotor main body 161a to the other side of the fan axial direction DRa. The rotor-side outer peripheral portion 161b is press inserted into an inner peripheral side of the cylindrical member 58. According to this structure, the multiple fan blades 52 are connected to the motor rotor 161.

As above, the turbo fan unit 18 is fixed to the rotating shaft 14 via the shaft housing 15, wherein the rotating shaft 14 is rotatable around the fan center line CL.

In the present embodiment, in a similar manner to the first embodiment, the turbo fan unit 18 is manufactured in accordance with the flowchart of FIG. 5. Therefore, the same effects to the first embodiment can be obtained in the present embodiment.

In the present embodiment, however, the rotor-side outer peripheral portion 161*b* is press inserted into the inner peripheral side of the cylindrical member 58 after the step S03. When the connecting step between the multiple fan blades 52 and the motor rotor 161 is finished, the turbo fan unit 18 is completed.

Further Embodiments (1) In the first embodiment, the blade-side welding projection 532 is provided at the center portion in the width direction of the fan blade 52. However, the blade-side welding projection may be provided at an end portion in the width direction of the fan blade 52.

In a similar manner, in the second embodiment, the plate-side welding projection 63 is provided in the area of the other-side side plate 60, in which the other-side side plate 60 is going to be connected to the fan blade 52, and provided at the center portion of the area in the width direction of the fan blade 52. However, the plate-side welding projection 63 may be provided at an end portion in the width direction of the fan blade 52.

(2) In the first embodiment, one blade-side welding projection 532 is provided in each of the multiple fan blades 52. However, multiple blade-side welding projections 532 may be provided in each of the multiple fan blades 52. For example, the multiple blade-side welding projections 532 may be provided in each of the multiple fan blades 52 at intervals in the width direction of the fan blade 52. Alternatively, the multiple blade-side welding projections may be provided in an extending direction of the fan blade 52.

In a similar manner, in the second embodiment, one plate-side welding projection 63 is provided in each of the areas, in which the other-side side plate 60 is going to be connected to each of the multiple fan blades 52. However, multiple plate-side welding projections 63 may be provided in each of the areas, in which the other-side side plate 60 is going to be connected to each of the multiple fan blades 52.

As above, it is possible to optionally change the place and the number of the blade-side welding projection 532 or the plate-side welding projection 63, so long as the multiple fan blades 52 and the other-side side plate 60 can be connected to each other.

(3) In each of the above embodiments, after the multiple fan blades 52 are connected to the other-side side plate 60, as shown in FIG. 9, the inner peripheral end 604 of the plate-side guide surface 603 in the fan radial direction DRr is located at the position closer to the other side of the fan axial direction DRa than the outer peripheral end 562*b* of the boss-side guide surface 562*a* in the fan axial direction DRa. However, the inner peripheral end 604 of the plate-side guide surface 603 in the fan radial direction DRr may be located at the same position in the fan axial direction DRa to that of the outer peripheral end 562*b* of the boss-side guide surface 562*a* in the fan axial direction DRa.

(4) The present disclosure is not limited to the above embodiments but can be modified in various manners within a scope defined in the claims. The present disclosure includes various kinds of modified embodiments and such modifications included in equivalent areas. In addition, the above embodiments are not unrelated to one another and can be appropriately combined to one another except for such a case in which the combination is impossible in an obvious fashion. In addition, it is needless to say that the elements for forming the embodiments are not always necessary, unless the elements are explicitly disclosed as the necessary elements or it is considered that the elements are necessary in principle. In addition, in the above embodiments, when the values for the number, the numerical values, the quantity, the ranges or the like are referred to for the elements of the embodiments, the present disclosure is not limited to those specified values, except for a case in which those values are explicitly disclosed as necessary or the present disclosure should be limited to those specified values in principle. In addition, when the above embodiments refer to the material, the shape, the positional relationships and so on for the respective elements, the present disclosure is not limited to those material, the shapes, the positional relationships and so on, unless the present disclosure explicitly discloses or the present disclosure is limited in principle to those of the specified material, the shapes, the positional relationships and so on.

SUMMARY

According to a first point disclosed in a part or in an entire portion of each of the above embodiments, the method for manufacturing the turbo fan unit 18 includes a step for preparing the multiple fan blades and the other-side side plate, and a step for connecting each of the multiple fan blades to the other-side side plate by the welding process. In the preparing step, the multiple fan blades or the other-side side plate is prepared, in which the connecting-surface forming portion having the connecting surface and the welding projection is formed. In the welding step, the welding projection is melted down and the connecting surface is connected to the opposing surface, which is the surface of one of the multiple fan blades and the other-side side plate and which is opposed to the connecting surface.

In addition, according to a second point, in the preparing step, the multiple fan blades are prepared, wherein each of the fan blades has the blade-side surface forming portion as the connecting-surface forming portion and the blade-side welding projection as the welding projection. The blade-side connecting surface, which is connected to the other-side side plate, is formed in each of the blade-side surface forming portions of the multiple fan blades. Each of the blade-side welding projections of the multiple fan blades is protruded from the respective blade-side connecting surface. In the welding step, each of the blade-side welding projections is melted down and each of the blade-side connecting surfaces is connected to the opposing surface of the other-side side plate, wherein the opposing surface is opposing to the blade-side connecting surface.

The structure of the first point is concretely realized by the structure of the second point.

In addition, according to a third point, in the preparing step, the other-side side plate having the multiple recessed portions is prepared. The multiple recessed portions are formed in the other-side side plate on its side facing the multiple fan blades. Each of the recessed portions has the bottom surface and the side surfaces at both sides of the bottom surface. The width between the side surfaces in each of the multiple recessed portions is larger than the width of each blade-side surface forming portion of the multiple fan blades. In the welding step, each of the blade-side surface forming portions of the multiple fan blades is arranged in the inside of the respective recessed portion. In this condition, each of the blade-side welding projections is melted down and the blade-side connecting surface is connected to the part of each bottom surface of the multiple recessed portions, which works as the opposing surface.

According to the above structure and steps, the resin melt of the blade-side welding projection spreading out from the blade-side connecting surface remains in the inside of the recessed portion. Therefore, it is possible to prevent the burr from being protruded to the blade passage.

In addition, according to a fourth point, in the preparing step, the other-side side plate is prepared, wherein the other-side side plate has the multiple plate-side surface forming portions as the connecting-surface forming portions and the multiple plate-side welding projections as the welding projections. The plate-side connecting surface, which is welded to each of the multiple fan blades, is formed in each of the multiple plate-side surface forming portions. Each of the multiple plate-side welding projections is protruded from the respective plate-side connecting surface of the multiple plate-side surface forming portions. In the welding step, each of the multiple plate-side welding projections is melted down. Each of the plate-side connecting surfaces is welded to the opposing surface of each fan blade, wherein the opposing surface is opposing to the plate-side connecting surface.

The structure of the first point is concretely realized by the structure of the fourth point.

In addition, according to a fifth point, each of the multiple plate-side surface forming portions is protruded from the surface of the other-side side plate, which is the surface to be connected to each of the multiple fan blades. Furthermore, the plate-side connecting surface is formed at each of the top portions of the multiple plate-side surface forming portions. In the preparing step, the multiple fan blades each having the recessed portion are prepared. Each of the recessed portions of the multiple fan blades is formed in each of the multiple fan blades on the side, on which the multiple fan blades are connected to the other-side side plate. Each of the recessed portions has the bottom surface and the side surfaces located at the both sides of the bottom surface. The width between the both side surfaces of each of the multiple fan blades is larger than each width of the multiple plate-side surface forming portions. In the connecting step, each of the multiple plate-side surface forming portions is arranged in the inside of each recessed portion of the multiple fan blades. In this condition, each of the multiple plate-side welding projections is melted down, so that each of the plate-side connecting surfaces of the multiple plate-side surface forming portions is welded to the part of the bottom surface of each recessed portion of the multiple fan blades, wherein the bottom surface works as the opposing surface.

According to the above structure and steps, the resin melt of the plate-side welding projection spreading out from the plate-side connecting surface remains in the inside of the recessed portion. Therefore, it is possible to prevent the burr from being protruded to the blade passage.

In addition, according to a sixth point, in the preparing step, the integrally molded component is prepared, wherein the multiple fan blades, the shroud ring and the air-flow guide portion are integrally molded to one another. The structure of the first point to the fifth point is concretely realized by the structure of the sixth point.

What is claimed is:

1. A method for manufacturing a turbo fan unit to be used in a blower device, wherein the turbo fan unit comprises:
    multiple fan blades arranged around a fan center line;
    a shroud ring connected to one side of each of the multiple fan blades in an axial direction of the fan center line and forming an air suction port through which air is sucked;
    an other-side side plate connected to the other side of each of the multiple fan blades in the axial direction of the fan center line; and
    an air-flow guide portion located at a position inside of the other-side side plate in a fan radial direction for guiding an air flow sucked from the air suction port in a direction from an inside to an outside of the fan radial direction,
    wherein the air-flow guide portion has an air guide surface, which is formed in the air-flow guide portion to face the air suction port and which guides the air flow sucked from the air suction port,
    wherein the other-side side plate has a plate-side guide surface, which faces blade passages respectively formed between neighboring fan blades of the multiple fan blades, and which guides an air flow passing through the blade passages,
    wherein the method for manufacturing the turbo fan unit comprises;
    a preparing step for preparing the multiple fan blades and the other-side side plate; and
    a connecting step for connecting each of the multiple fan blades to the other-side side plate by a welding process,
    wherein, in the preparing step, an integrally molded component is prepared, in which the multiple fan blades, the shroud ring and the air-flow guide portion are integrally molded to one another, while the other-side side plate is prepared as a separate member from the integrally molded component,
    wherein, in the preparing step, one of the multiple fan blades and the other-side side plate is prepared, which has;
        a connecting-surface forming portion having a connecting surface, which is connected to the other one of the multiple fan blades and the other-side side plate, and
        a welding projection protruded from the connecting surface;
    wherein, in the connecting step, the welding projection is melted down and the connecting surface is connected to an opposing surface, which is a surface of the other one of the multiple fan blades and the other-side side plate and which is opposing to the connecting surface, and
    wherein an inner peripheral end of the plate-side guide surface in the fan radial direction is located at a position closer to the other side of the axial direction than an outer peripheral end of the air guide surface in the fan radial direction, when the multiple fan blades are connected to the other-side side plate.

2. The method for manufacturing the turbo fan unit according to claim 1, wherein
    in the preparing step, the multiple fan blades are prepared, each of which has;
        a blade-side surface forming portion as the connecting-surface forming portion; and
        a blade-side welding projection as the welding projection,
    a blade-side connecting surface, which is connected to the other-side side plate, is formed in each of the blade-side surface forming portions of the multiple fan blades, each of the blade-side welding projections of the multiple fan blades is protruded from each of the blade-side connecting surfaces, and in the connecting step, each of the blade-side welding projections is melted down and each of the blade-side connecting surfaces is connected to the opposing surface, which is the surface of the other-side side plate and which is opposing to the blade-side connecting surface.

3. The method for manufacturing the turbo fan unit according to claim 2, wherein in the preparing step, the other-side side plate having a recessed portion is prepared, the recessed portion is formed in the other-side side plate on a side facing one of the multiple fan blades, wherein has a bottom surface and side surfaces located at both sides of the bottom surface, a width between the both side surfaces in the recessed portion is larger than a width of each of the blade-side surface forming portions of said one of the multiple fan blades, in the connecting step, the blade-side welding projection is melted down in a condition that each of the blade-side surface forming portions of said one of the multiple fan blades is arranged in an inside of the recessed portion, and the blade-side connecting surface is connected to a part of the bottom surface of the recessed portion, wherein the bottom surface works as the opposing surface.

4. The method for manufacturing the turbo fan unit according to claim 1, wherein in the preparing step, the other-side side plate is prepared, which has;
  a plate-side surface forming portion as the connecting-surface forming portion; and
  a plate-side welding projection as the welding projection, a plate-side connecting surface, which is connected to one of the multiple fan blades, is formed in the plate-side surface forming portion of the other-side side plate, the plate-side welding projection is protruded from the plate-side connecting surface of the plate-side surface forming portion, and in the connecting step, the plate-side welding projection is melted down, and the plate-side connecting surface is connected to the opposing surface, which is the surface of said one of the multiple fan blades and which is opposing to the plate-side connecting surface.

5. The method for manufacturing the turbo fan unit according to claim 4, wherein the plate-side surface forming portion is protruded from a surface of the other-side side plate on a side, on which the other-side side plate is connected to each of the multiple fan blades, the plate-side connecting surface is formed at a top portion of the plate-side surface forming portion, in the preparing step, one of the multiple fan blades having a recessed portion is prepared, the recessed portion of said one of the multiple fan blades is formed on a side of the fan blade, on which said one of the fan blades is connected to the other-side side plate, the recessed portion has a bottom surface and side surfaces located at both sides of the bottom surface, a width between the side surfaces at the both sides of said one of the multiple fan blades is larger than a width of the plate-side surface forming portion, and in the connecting step, the plate-side welding projection is melted down in a condition that the plate-side surface forming portion is arranged in an inside of the recessed portion of said one of the multiple fan blades, and the plate-side connecting surface of the plate-side surface forming portion is connected to a part of the bottom surface of the recessed portion of said one of the multiple fan blades, wherein the bottom surface works as the opposing surface.

6. The method for manufacturing the turbo fan unit according to claim 1, wherein, in the preparing step, the other-side plate is prepared, which has;
  a plate-side surface forming portion having a plate-side connecting surface, which is connected to said other one of the multiple fan blades, and
  a plate-side welding projection protruded from the plate-side connecting surface;

wherein, in the connecting step, the plate-side welding projection is melted down and the plate-side connecting surface is connected to an opposing surface of said other one of the multiple fan blades, which is opposing to the plate-side connecting surface.

7. A method for manufacturing a turbo fan unit to be used in a blower device, wherein the turbo fan unit comprises:
  multiple fan blades arranged around a fan center line;
  a shroud ring connected to one side of each of the multiple fan blades in an axial direction of the fan center line and forming an air suction port through which air is sucked;
  a side plate connected to the other side of each of the multiple fan blades in the axial direction of the fan center line; and
  an air-flow guide portion located at a position inside of the side plate in a fan radial direction for guiding an air flow sucked from the air suction port in a direction from an inside to an outside of the fan radial direction, wherein the air-flow guide portion has an air guide surface, which is formed in the air-flow guide portion to face the air suction port and which guides the air flow sucked from the air suction port, wherein the side plate has a plate-side guide surface, which faces blade passages respectively formed between neighboring fan blades of the multiple fan blades, and which guides an air flow passing through the blade passages, wherein the method for manufacturing the turbo fan unit comprises;
  a preparing step for preparing the multiple fan blades and the side plate; and
  a connecting step for connecting each of the multiple fan blades to the side plate by a welding process, wherein, in the preparing step, an integrally molded component is prepared, in which the multiple fan blades, the shroud ring and the air-flow guide portion are integrally molded to one another, while the side plate is prepared as a separate member from the integrally molded component, wherein, in the preparing step, the multiple fan blades are prepared, each of which has;
  a blade-side surface forming portion having a blade-side connecting surface, which is connected to the side plate, and
  a blade-side welding projection protruded from the blade-side connecting surface;

wherein, in the connecting step, the blade-side welding projection is melted down and the blade-side connecting surface is connected to an opposing surface of the side plate, which is opposing to the blade-side connecting surface, and wherein an inner peripheral end of the plate-side guide surface in the fan radial direction is located at a position closer to the other side of the axial direction than an outer peripheral end of the air guide surface in the fan radial direction, when the multiple fan blades are connected to the side plate.

\* \* \* \* \*